Patented Dec. 2, 1930

1,783,216

UNITED STATES PATENT OFFICE

MAX BÖGEMANN, OF ELBERFELD, AND HERMANN FRIEDRICH, OF WEISDORF-ON-THE-RHINE, GERMANY, ASSIGNORS TO I. G. FARBENINDUSTRIE AKTIENGESELLSCHAFT, OF FRANKFORT-ON-THE-MAIN, GERMANY

PROCESS OF PRODUCING VULCANIZED RUBBER

No Drawing. Application filed June 3, 1924. Serial No. 717,640.

In United States Letters Patent No. 1,126,469 there are described processes for materially promoting the vulcanization of rubber by the use of bases, such as piperidine or its derivatives, etc.

We have now found that the bases and mixtures obtainable by the interaction of ammonia, primary or secondary amines with dihalogenated derivatives of the alkylene series in which the halogen atoms are attached to neighboring or adjacent carbon atoms, such as ethylene dichloride, propylene dichloride, butylene dichloride are excellent accelerators for the vulcanization of rubber. They are odorless and of high boiling point and can be easily mixed with caoutchouc without a molestation to the workmen or injury to their health. The vulcanized products are completely odorless, possess a very soft touch and show a surprisingly high tensile strength. From the mixture obtained by the interaction of ethylene dichloride with ammonia generally the following bases or mixtures of them can be easily isolated by a fractional distillation or also in another known manner with or without a diminution of pressure. All these products fall within the scope of our invention e. g. ethlyene-diamine $$NH_2.CH_2.CH_2.NH_2$$

boiling point from about 115 to 120° C. under a pressure of 760 mm.

boiling point from about 95–150° C. at a pressure of 18 mm.

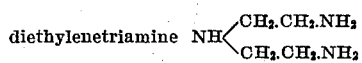

boiling point from about 145–155° C. at a pressure of 18 mm. and other highly viscous bases boiling about from 150–300° C. at a pressure of 188 mm.

It is not necessary to isolate the bases as above mentioned, their mixtures may also be used with the same success in varied quantities.

The term primary and secondary amines is used as generic to aliphatic amines such as methyl- or dimethyl-amine and to aromatic amines e. g. aniline, benzylamine, etc.

The following examples further illustrate the new process of the present invention; the parts being by weight:

*Example 1.*—100 parts of plantation rubber are mixed together with 8 parts of sulfur and 1 part of ethylene-diamine. This mixture is heated in a vulcanizing press for 30 minutes at 2 atmospheres pressure. After this time the product is completely vulcanized.

Other bases such as diethylenetriamine or triethylenetetramine can also be used in the same manner.

*Example 2.*—100 parts of natural or artificial rubber are mixed with 10 parts of factice, 10 parts of zinc oxide, 4 parts of sulfur and 1 part of a mixture of diethylenetriamine and triethylenetetramine. This mixture is heated in a vulcanizing press for 30 minutes at 2½ atmospheres pressure. The product is then completely vulcanized. It possesses a tensile strength of 180 kilogrammes per sq. cm. with an elongation at break of 700 per cent.

*Example 3.*—A mixture of 100 parts of rubber or a substance similar to it, 10 parts of zinc oxide, 6 parts of sulfur and 1 part of a mixture of ethylenediamine, diethylenetriamine and triethylenetetramine is heated in a vulcanizing press for 30 minutes at 1 atmosphere pressure. After this time the resulting product is completely vulcanized and has a tensile strength of 210 kilogrammes per sq. cm. with an elongation at break of 690 per cent.

We claim:—

1. As vulcanization accelerators the mixtures of di- and polyamines being obtainable by reacting with a compound of the general formula:

wherein $R_1$ and $R_2$ means hydrogen or alkyl, aryl or aralkyl groups upon a compound of the group consisting of dihalogenated ethylene, propylene and butylene, in which the halogen atoms are attached to adjacent carbon atoms.

2. As vulcanization accelerators the mixtures of di- and polyamines obtainable by reacting with ammonia upon ethylenedichloride.

3. As vulcanization accelerators, from the mixture of di- and polyamines obtainable by reacting with ammonia upon ethylene-dichloride, the fraction distilling over between about 95–300° C. at a pressure of 18 mm.

4. Vulcanized rubber having incorporated therewith before vulcanization a product as claimed in claim 1.

5. Vulcanized rubber having incorporated therewith before vulcanization a product as claimed in claim 2.

6. Vulcanized rubber having incorporated therewith before vulcanization a product as claimed in claim 3.

In testimony whereof we have hereunto set our hands.

MAX BÖGEMANN.
HERMANN FRIEDRICH.